(12) United States Patent
Ma (10) Patent No.: US 9,467,278 B2
(45) Date of Patent: Oct. 11, 2016

(54) METHODS AND APPARATUS FOR TRIMMING OF CDR CLOCK BUFFER USING PHASE SHIFT OF TRANSMIT DATA

(75) Inventor: Stanley Jeh-Chun Ma, Ottawa (CA)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 558 days.

(21) Appl. No.: 13/097,728

(22) Filed: Apr. 29, 2011

(65) Prior Publication Data

US 2012/0275555 A1   Nov. 1, 2012

(51) Int. Cl.
  *H04L 7/04* (2006.01)
  *H04L 7/00* (2006.01)
  *H04L 7/033* (2006.01)

(52) U.S. Cl.
  CPC .......... *H04L 7/0091* (2013.01); *H04L 7/0004* (2013.01); *H04L 7/0337* (2013.01)

(58) Field of Classification Search
  None
  See application file for complete search history.

(56) References Cited

U.S. PATENT DOCUMENTS

| | | | |
|---|---|---|---|
| 7,157,951 B1 * | 1/2007 | Morrison et al. | 327/263 |
| 7,826,581 B1 * | 11/2010 | Prather | H04L 7/0337 375/373 |
| 2004/0161068 A1 * | 8/2004 | Zerbe et al. | 375/355 |
| 2005/0021920 A1 * | 1/2005 | Cornelius et al. | 711/167 |
| 2008/0069279 A1 * | 3/2008 | Carballo | 375/354 |
| 2008/0080649 A1 * | 4/2008 | Gibbons et al. | 375/355 |
| 2009/0174455 A1 * | 7/2009 | Dimitriu | G06F 13/4072 327/295 |
| 2009/0177457 A1 * | 7/2009 | Dai et al. | 703/14 |
| 2010/0054383 A1 * | 3/2010 | Mobin et al. | 375/371 |
| 2010/0188129 A1 | 7/2010 | Ma | |
| 2011/0261915 A1 * | 10/2011 | Li | 375/359 |
| 2012/0173914 A1 * | 7/2012 | Mobin | 713/401 |
| 2013/0021074 A1 * | 1/2013 | Finn et al. | 327/162 |

* cited by examiner

*Primary Examiner* — Shuwang Liu
*Assistant Examiner* — Gina McKie

(57) ABSTRACT

Methods and apparatus are provided for trimming one or more clock buffers in a clock and data recovery system in a receiver using a phase shift of the transmit data. At least one clock buffer is trimmed by synchronizing the clock and data recovery system to a transmit clock received from a transmitter. A transmit data signal that is received from the transmitter is then sampled using at least a first latch in the receiver. A phase of the transmit data signal is adjusted in the transmitter until values sampled by the first latch satisfy a first predefined criteria (such as approximately 50% binary ones and 50% binary zeroes). The phase of the transmit data signal is adjusted again to an approximate phase location of a second latch in the receiver, and the transmit data signal is sampled using the second latch. A phase of a clock buffer associated with the second latch is then adjusted until values sampled by the second latch satisfy a second predefined criteria.

19 Claims, 6 Drawing Sheets

METHODS AND APPARATUS FOR TRIMMING OF CDR CLOCK BUFFER USING PHASE SHIFT OF TRANSMIT DATA

FIELD OF THE INVENTION

The present invention relates generally to clock recovery techniques and, more particularly, to techniques for trimming one or more clock buffers in a clock and data recovery system.

BACKGROUND OF THE INVENTION

In many applications, including digital communications, clock and data recovery (CDR) must be performed before data can be decoded. Generally, in a CDR system, timing information is extracted from an input data stream and a recovered clock signal of a given frequency is generated, often with a number of additional phase-offset clock signals having the same frequency but with different phases than the recovered clock signal.

Figure 1:
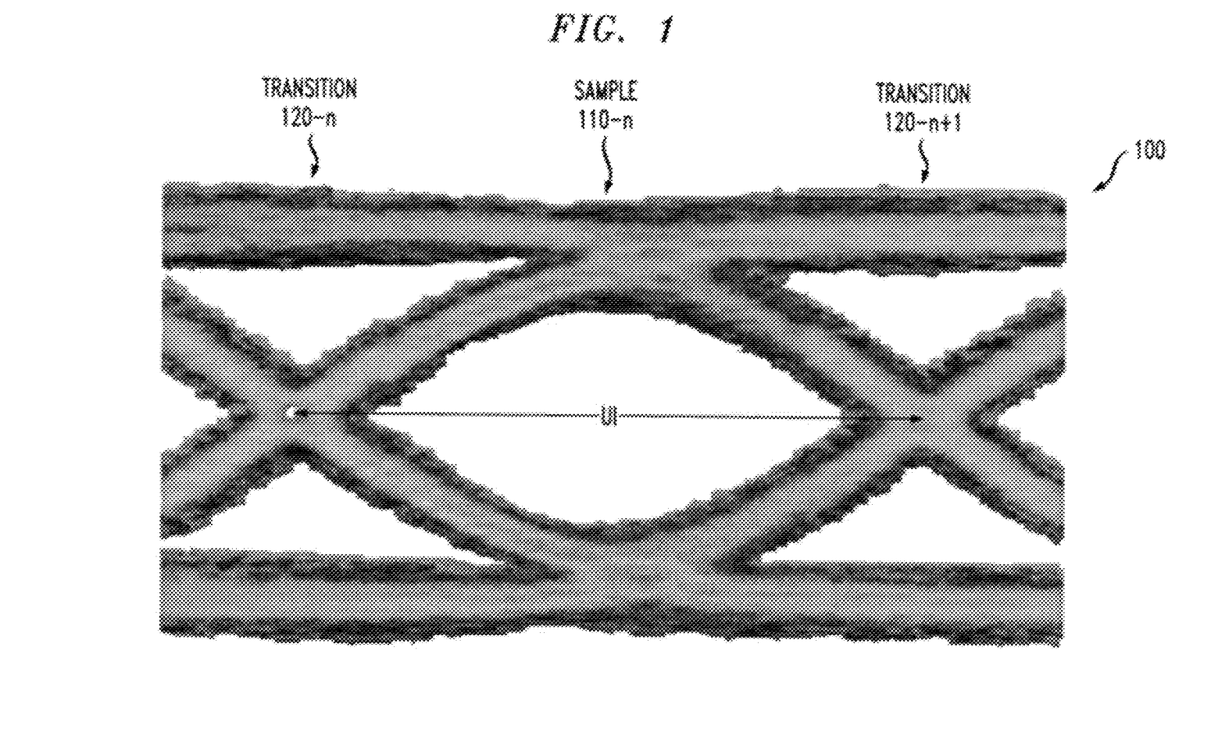
FIG. 1 illustrates transitions within a data stream histogram.

FIG. 1 illustrates the transitions of a data stream histogram 100 for a given unit interval (UI). As shown in FIG. 1, the input data stream is "ideally" sampled at a sample point 110-*n* substantially in the middle of the unit interval between two adjacent transition points 120-*n*, 120-*n*+1. The phases of the phase-offset clock signals generated by the CDR system are often adjusted to align with the transition points 120-*n*, 120-*n*+1 and sample point 110-*n*. Thus, the phase of a sampling clock is often adjusted so that the data sampling is performed at the sample point 110-*n*, substantially at the center of a "data eye," in a known manner. In addition, the phase of a transition clock is often adjusted so that additional sampling is performed at the transition points 120-*n*, 120-*n*+1, to maintain proper timing and thereby determine an appropriate location of the sample point 110-*n*.

The duty cycle of a clock signal can be expressed as the ratio of all pulse durations to the total period. A clock signal is a square wave that should typically demonstrate a 50% duty cycle. Duty cycle distortion arises, for example, due to mismatches in the clock buffers that are required to drive these clock phases, and due to variations in the different signal paths for clock and data. The target 50% duty cycle feature is particularly important for high-speed applications where both positive and negative edges of the clock signal are often used to sample the incoming signal. Thus, a trimming technique is often performed for the clock buffers to adjust a phase of the corresponding clock signal and thereby compensate for the mismatch.

A number of techniques have been proposed for the trimming of clock buffers. Existing techniques, however, often use a reference clock to trim the different clock signals. Any duty cycle distortion in the reference clock directly and negatively influences the performance of the clock trim operation. A need therefore exists for improved techniques for the trimming of clock buffers that demonstrate a reduced sensitivity to duty cycle distortion in the reference clock.

SUMMARY OF THE INVENTION

Generally, methods and apparatus are provided for trimming one or more clock buffers in a clock and data recovery system of a receiver using a phase shift of transmit data transmitted by a transmitter. The clock buffers typically drive a plurality of clock signals, such as well-known transition clock signals and data sampling clock signals, having a substantially uniform phase separation. For example, a phase separation between adjacent clocks of approximately one-half of a unit interval (UI) may be obtained using the disclosed trimming process.

According to one aspect of the invention, at least one clock buffer in a clock and data recovery system is trimmed by synchronizing the clock and data recovery system to a transmit clock of a transmitter; sampling a transmit data signal received from the transmitter using at least a first latch in the receiver; adjusting a phase of the transmit data signal in the transmitter until values sampled by the first latch satisfy a first predefined criteria; adjusting the phase of the transmit data signal in the transmitter to an approximate phase location of a second latch in the receiver; sampling the transmit data signal using at least the second latch; and adjusting a phase of a clock buffer associated with the second latch until values sampled by the second latch satisfy a second predefined criteria.

In one exemplary embodiment, the first latch is a transition latch or a sample latch and the second latch is the other of the transition latch and the sample latch. The transmit data signal may be transmitted by the transmitter, for example, in a loopback mode.

In one exemplary implementation, the first and second predefined criteria may comprise a corresponding histogram exhibiting a predefined percentage of each possible logic value of the sampled transmit data signal. For example, for a binary implementation, the first and second predefined criteria may specify that each binary value is sampled by the corresponding latch approximately 50% of the time.

A more complete understanding of the present invention, as well as further features and advantages of the present invention, will be obtained by reference to the following detailed description and drawings.

DETAILED DESCRIPTION

The present invention provides methods and apparatus for trimming CDR clock buffers to properly position the CDR data sampling point and CDR timing (transition) sampling point. While the present invention is illustrated in the context of an exemplary two unit interval (UI) architecture, the present invention can be applied to an architecture employing any number of UIs, as would be apparent to a person of ordinary skill in the art. In addition, while the present invention is illustrated in the context of a transceiver environment, the disclosed CDR clock buffer trimming techniques can be applied in any CDR environment where timing information is extracted by a receiver from a transmit data signal received from a transmitter, as would be apparent to a person of ordinary skill in the art.

Figure 2:
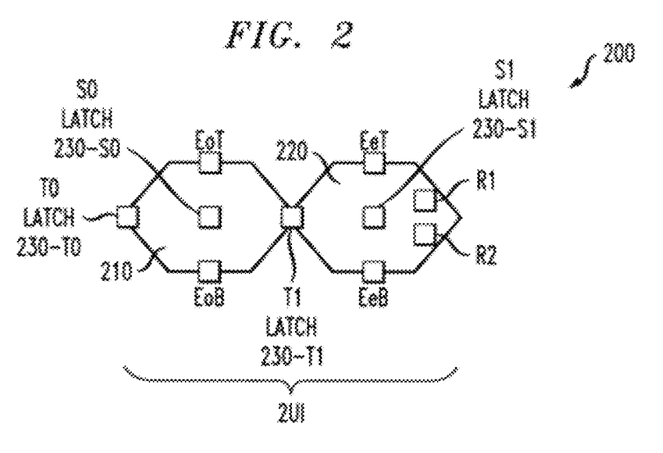
FIG. 2 illustrates an exemplary set of latches for sampling a received signal over two unit intervals.

As previously indicated, a digital clock recovery system typically extracts timing information from an input serial data stream and generates a number of phase-offset clock signals having the same frequency but with different phases, typically referred to as transition and sample clocks, as discussed further below in conjunction with FIG. 3. FIG. 2 illustrates an exemplary set 200 of latches for sampling a received signal over two unit intervals. A first data eye 210 in a two UI window is often referred to as the "odd eye," while the second data eye 220 is often referred to as the "even eye." The exemplary data latches 200 in FIG. 2 comprise a T0 transition latch 230-T0 and an S0 sample latch 230-S0 for sampling the odd eye, and a T1 transition latch 230-T1 and an S1 sample latch 230-S1 for sampling the even eye. The present invention provides improved techniques for trimming clock buffers, discussed further below in conjunction with FIG. 4, that drive the transition clocks and sample clock signals that are used to clock the corresponding T0 transition latch 230-T0, S0 sample latch 230-S0, T1 transition latch 230-T1 and S1 sample latch 230-S1. In an exemplary embodiment, the data and timing sampling are performed alternately between the odd eye 210 and the even eye 220, in a known manner.

In addition, as shown in FIG. 2, the exemplary data latches 200 may also comprise a top error latch, EoT, and a bottom error latch, EoB, in the odd eye 210, and a top error latch, EeT, and a bottom error latch, EeB, in the even eye 220, in a known manner. Finally, the exemplary data latches 200 may optionally comprise a top roaming latch, R1, and a bottom roaming latch, R2.

Figure 3:
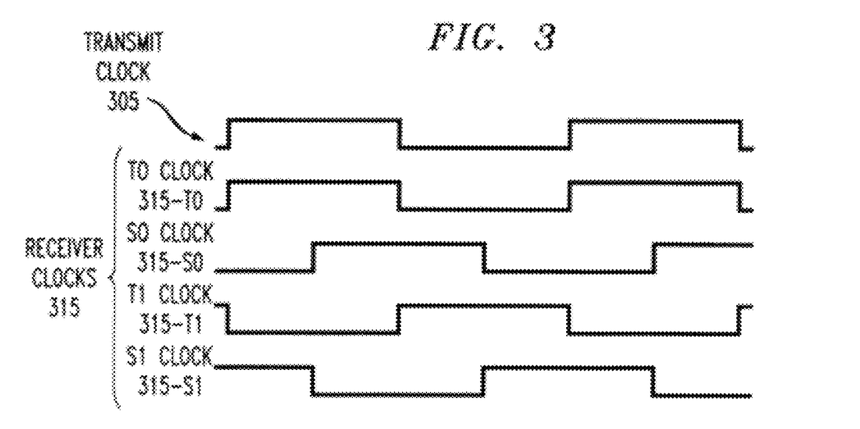
FIG. 3 is a timing diagram illustrating a transmit clock of an exemplary transmitter and a set of receiver clocks of an exemplary receiver.

FIG. 3 is a timing diagram 300 illustrating a transmit clock 305 of an exemplary transmitter and a set of receiver clocks 315 of an exemplary receiver. As shown in FIG. 3, the exemplary receiver clocks 315 comprise a T0 transition clock 315-T0, an S0 sample clock 315-S0, a T1 transition clock 315-T1, and an S1 sample clock 315-S1 (collectively, receiver clocks 315). The manner in which the transmit clock 305 can be divided to generate full rate, half rate and quarter rate clocks, if desired, is apparent to a person of ordinary skill in the art.

FIG. 3 illustrates the sampling points for the receiver clocks 315 for the odd and even eyes in each two UI window, relative to the transmit clock 305. Generally, the exemplary T0 transition clock 315-T0 is phase aligned with the transmit clock 305, and the exemplary T1 transition clock 315-T1 is an inverted version of the exemplary T0 transition clock 315-T0. In addition, the first sampling clock, 315-S0, is phase shifted from the first transition clock 315-T0, by an amount approximately equal to one half (½) of a UI. In addition, the second sampling clock 315-S1 is an inverted version of the first sampling clock 315-S0. For example, as shown in FIG. 3, for the transmit clock 305, the sampling points (i.e., rising edges) of the two transition clocks, 315-T0 and 315-T1, are aligned with the first rising and falling edges, respectively, of the transmit clock 305.

Figure 4:
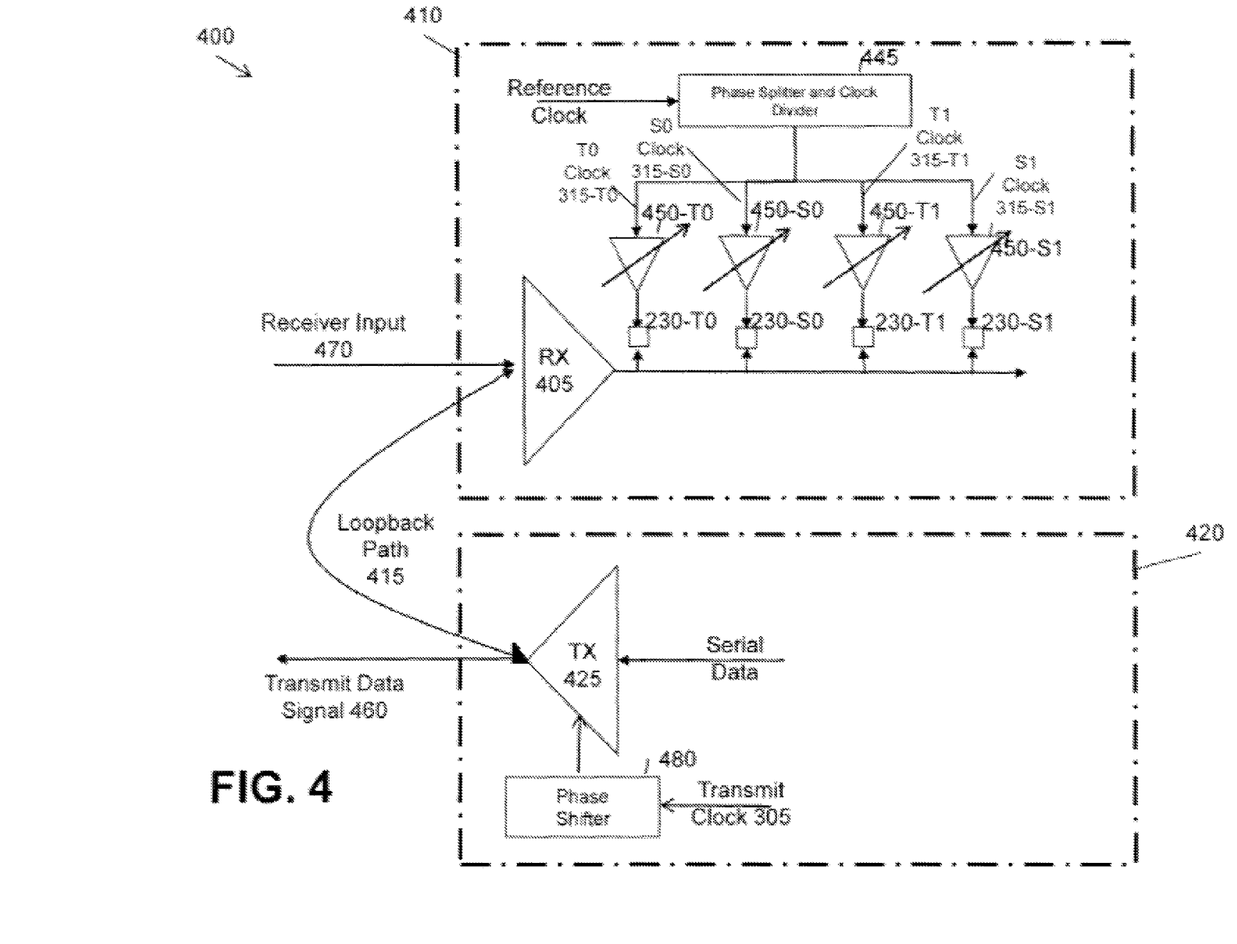
FIG. 4 illustrates an exemplary transceiver in which the present invention can operate.

FIG. 4 illustrates an exemplary transceiver 400 in which the present invention can operate. The exemplary transceiver 400 comprises a receive portion 410 and a transmit portion 420. In addition, as shown in FIG. 4, a reference clock is applied in the receive portion 410 to a phase splitter and clock divider 445. Generally, the exemplary phase splitter and clock divider 445 optionally divides the reference clock, and generates four phase-offset versions of a selected clock, in a known manner. In the exemplary embodiment of FIG. 4, the phase-offset versions of the reference clock comprise the receiver clocks 315 of FIG. 3.

The T0 transition clock 315-T0, S0 sample clock 315-S0, T1 transition clock 315-T1, and S1 sample clock 315-S1 are each applied to a corresponding clock buffer 450-T0, 450-S0, 450-T1 and 450-S1 (collectively, referred to herein as clock buffers 450). The clock buffers 450 have an adjustable phase. As discussed further below in conjunction with FIG. 5, the present invention trims the phase of the clock buffers 450 in a manner that has a reduced sensitivity to duty cycle distortion in the reference clock.

The output of each clock buffer 450-T0, 450-S0, 450-T1 and 450-S1 is applied to a corresponding latch 230-T0, 230-S0, 230-T1 and 230-S1 (collectively, referred to herein as latches 230). The latches 230 sample the receiver input 470 at the output of a buffer 405, for example, on the basis of rising and/or falling edges of the corresponding transition or sampling clock, 315-T0, 315-S0, 315-T1, 315-S1.

As shown in FIG. 4, the exemplary transmit portion 420 includes a buffer 425 to convert a serial data stream to a transmit data signal 460 for transmission. A loopback path 415 is provided between the transmit portion 420 and the receive portion 410 so that the transmit data signal 460 can be transmitted from the local transmitter to the local receiver, in a loopback mode. In one exemplary embodiment, the transmit data signal 460 is a clock-like data pattern. In the loopback mode, the transmit data signal 460 is received by the receive portion 410 and the received data stream is sampled by the receive portion 410 using the latches 230 associated with the receiver clocks 315. Generally, the phases of the adjustable clock buffers 450 are adjusted by the disclosed clock buffer trim process 500.

According to one aspect of the invention, discussed further below in conjunction with FIG. 5, the transceiver 400 includes a phase shifter 480 to allow the transmit portion 420 to shift the phase of the transmit data signal 460 to a desired phase. The phase shifter 480 may be implemented, for example, in accordance with the teachings of United States Patent Application Publication No. 2010/0188129, entitled "Method and Apparatus for Applying Clock Phase and Frequency Offset," incorporated by reference herein.

Figure 5:
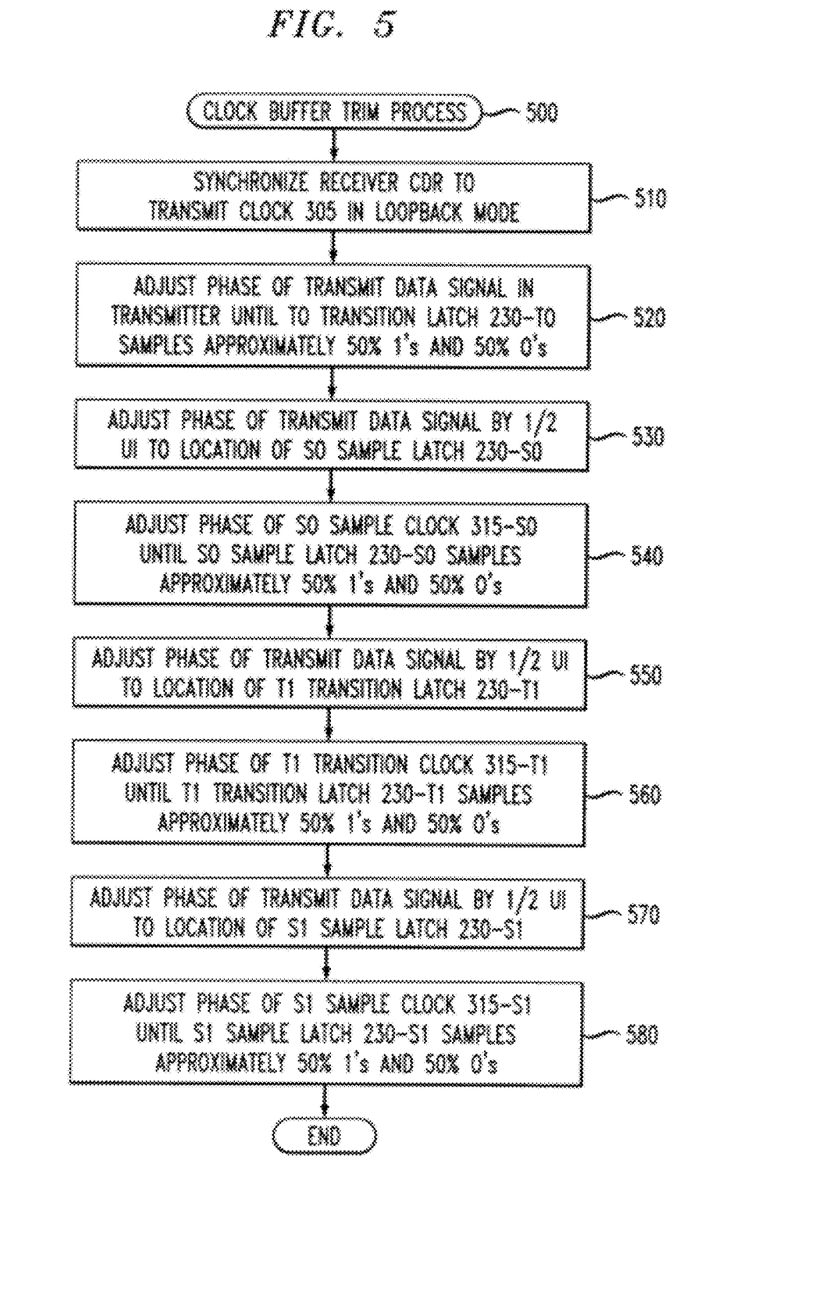
FIG. 5 is a flow chart describing an exemplary implementation of a clock buffer trim process incorporating features of the present invention.

FIG. 5 is a flow chart describing an exemplary implementation of a clock buffer trim process 500 incorporating features of the present invention. As shown in FIG. 5, the exemplary clock buffer trim process 500 initially synchronizes the receiver CDR during step 510 to the frequency of the transmit clock 305 in a loopback mode.

During step 520, the clock buffer trim process 500 adjusts the phase of the transmit data signal 460 in the transmitter (using the phase shifter 480) until the T0 transition latch 230-T0 samples a substantially equal number of binary ones (1s) and binary zeroes (0s). In the exemplary embodiment of the clock buffer trim process 500, the T0 transition latch 230-T0 is used as a reference latch and the remaining latches 230 are trimmed relative to the trimming of the T0 transition latch 230-T0. Any of the transition and sample latches 230-T0, 230-S0, 230-T1, 230-S1 in the exemplary embodiment can be used as the reference latch and the remaining latches 230 are trimmed relative to the trimming of the reference latch.

During step 530, the clock buffer trim process 500 adjusts the phase of the transmit data signal 460 (using the phase shifter 480) by approximately one-half of a UI, to the phase location of the S0 sample clock 315-S0 and corresponding S0 sample latch 230-S0. The phase of the clock buffer 450-S0 associated with the S0 sample clock 230-S0 is adjusted during step 540 until the S0 sample latch 230-S0 samples a substantially equal number of binary ones (1s) and binary zeroes (0s).

During step 550, the clock buffer trim process 500 again adjusts the phase of the transmit data signal 460 (using the phase shifter 480) by approximately one-half of a UI, to the phase location of the T1 transition clock 315-T1 and corresponding T1 transition latch 230-T1. The phase of the clock buffer 450-T1 associated with the T1 transition clock 315-T1 is adjusted during step 560 until the T1 transition latch 230-T1 samples a substantially equal number of binary ones (1s) and binary zeroes (0s).

During step 570, the clock buffer trim process 500 again adjusts the phase of the transmit data signal 460 (using the phase shifter 480) by approximately one-half of a UI, to the phase location of the S1 sample clock 315-S1 and corresponding S1 sample latch 230-S1. The phase of the clock buffer 450-S1 associated with the S1 sample clock 315-S1 is adjusted during step 580 until the S1 sample latch 230-S1 samples a substantially equal number of binary ones (1s) and binary zeroes (0s).

While the clock buffer trim process 500 is illustrated using a uniform one-half UI phase separation between each adjacent transition and sample latch 230, the phase shift can be skewed (such as a phase separation of 0.47 UI between a first transition latch and a first sample latch, and 0.53 UI between the first sample latch and the subsequent transition latch), for example, in a Decision Feedback Equalization (DFE) implementation, as would be apparent to a person of ordinary skill in the art. In general, the exemplary clock buffer trim process 500 can be modified to trim any number of arbitrary clocks and corresponding clock buffers in the CDR to any arbitrary location.

Figure 6:
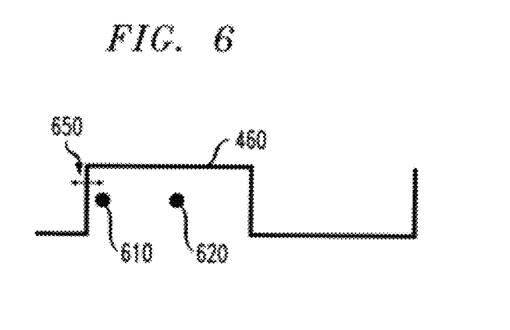
FIGS. 6 through 10 illustrate the transmit data signal of FIG. 4 at various stages during the implementation of the clock buffer trim process of FIG. 5.

FIGS. 6 through 10 illustrate the transmit data signal 460 of FIG. 4 at various stages during the implementation of the clock buffer trim process 500 of FIG. 5. FIG. 6 illustrates the transmit data signal 460, as received by the receive portion 410, during the implementation of step 520 of the clock buffer trim process 500. As indicated above, during step 520, the clock buffer trim process 500 adjusts the phase of the transmit data signal 460 (as shown by arrow 650) until the T0 transition latch 230-T0 samples a substantially equal number of binary ones (1s) and binary zeroes (0s). At this time, the T0 transition latch 230-T0 is sampling the receiver input 470 at a clock position 610 and the S0 sample latch 230-S0 is sampling the receiver input 470 at a clock position 620.

Figure 7:
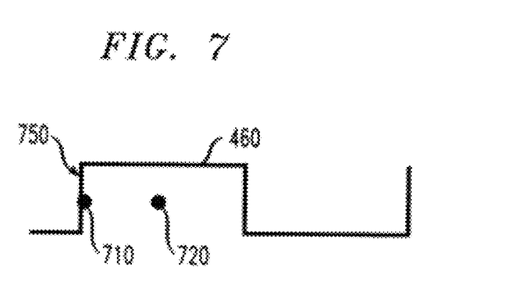

FIG. 7 illustrates the transmit data signal 460, as received by the receive portion 410, at a time just after the implementation of step 520 of the clock buffer trim process 500. As indicated above, during step 520, the clock buffer trim process 500 adjusts the phase of the transmit data signal 460 to a position 750, where the T0 transition latch 230-T0 outputs a substantially equal number of binary ones (1s) and binary zeroes (0s). At this time, the T0 transition latch 230-T0 is sampling the receiver input 470 at a clock position 710 (aligned to the rising edge of the transmit data signal 460 and therefore the rising edge of the transmit clock 305) and the S0 sample latch 230-S0 is sampling the receiver input 470 at a clock position 720 (with a one-half UI spacing).

Figure 8:
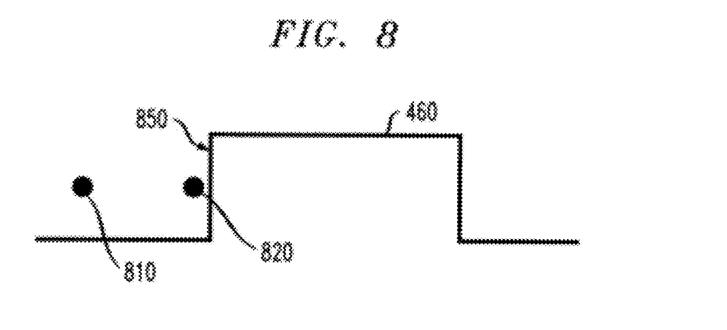

FIG. 8 illustrates the transmit data signal 460, as received by the receive portion 410, at a time just after the implementation of step 530 of the clock buffer trim process 500. As indicated above, during step 530, the clock buffer trim process 500 adjusts the phase of the transmit data signal 460 by approximately one-half of a UI to a position 850, to the approximate location of the S0 sample latch 230-S0. At this time, the T0 transition latch 230-T0 is sampling the receiver input 470 at a clock position 810 and the S0 sample latch 230-S0 is sampling the receiver input 470 at a clock position 820.

Figure 9:
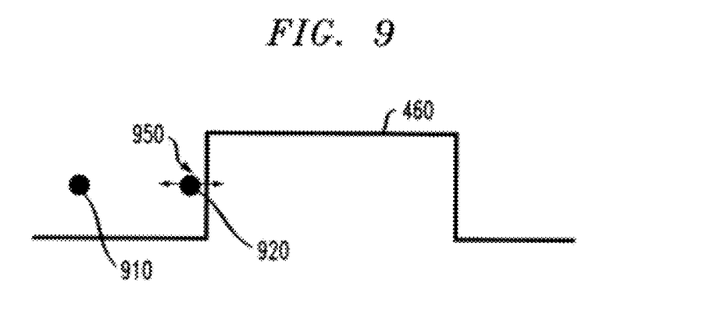

FIG. 9 illustrates the transmit data signal 460, as received by the receive portion 410, during the implementation of step 540 of the clock buffer trim process 500. As indicated above, during step 540, the clock buffer trim process 500 adjusts the phase of the clock buffer 450-S0 associated with the S0 sample clock 315-S0 (as shown by arrow 950) until the S0 sample latch 230-S0 outputs a substantially equal number of binary ones (1s) and binary zeroes (0s). At this time, the T0 transition latch 230-T0 is sampling the receiver input 470 at a clock position 910 and the S0 sample latch 230-S0 is sampling the receiver input 470 at a clock position 920 (with a one-half UI spacing).

Figure 10:
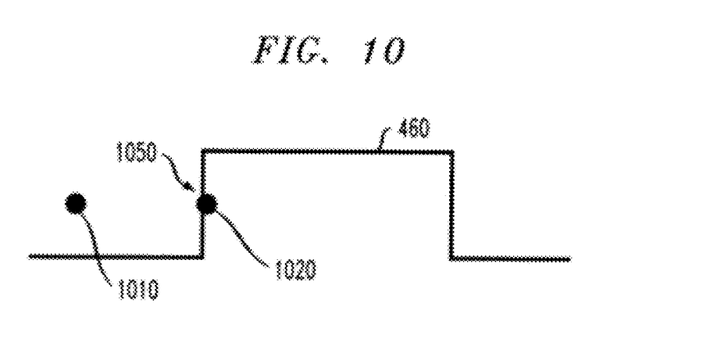

FIG. 10 illustrates the transmit data signal 460, as received by the receive portion 410, at a time just after the implementation of step 540 of the clock buffer trim process 500. As indicated above, during step 540, the clock buffer trim process 500 adjusts the phase of the clock buffer 450-S0 associated with the S0 sample clock 315-S0 to a position 1020 where the S0 sample latch 230-S0 outputs a substantially equal number of binary ones (1s) and binary zeroes (0s). At this time, the T0 transition latch 230-T0 is sampling the receiver input 470 at a clock position 1010 and the S0 sample latch 230-S0 is sampling the receiver input 470 at a clock position 1020 (aligned to the rising edge of the transmit data signal 460).

The trimming of the phase of the T1 and S1 clock buffers 450-T1 and 450-S1 would be performed in a similar manner, as would be apparent to a person of ordinary skill in the art.

As previously indicated, the arrangements of CDR circuitry and associated phase shifting circuitry, in conjunction with the clock buffer trim process 500, as described above in conjunction with FIGS. 4 and 5, provide a number of advantages relative to conventional arrangements. As indicated above, the disclosed clock buffer trim process 500 exhibits a significantly reduced sensitivity to duty cycle distortion in the reference clock.

Again, it should be emphasized that the above-described embodiments of the invention are intended to be illustrative only. In general, the exemplary CDR circuitry and associated phase shifting circuitry of FIG. 4 and the clock buffer trim process 500 of FIG. 5 can be modified, as would be apparent to a person of ordinary skill in the art, to trim any number of clock buffers and corresponding clock signals to any arbitrary phase location and for any desired phase separation between each adjacent clock. In addition, the exemplary CDR circuitry and associated phase shifting circuitry of FIG. 4 and the clock buffer trim process 500 of FIG. 5 can be modified to accommodate architectures employing any number of UIs, and employed in any CDR environment where timing information is extracted by a receiver from a transmit data signal received from a transmitter.

While exemplary embodiments of the present invention have been described with respect to circuitry elements in FIG. 4 and processing steps in FIG. 5, as would be apparent to one skilled in the art, various functions (such as the phase control aspects of the present invention) may be implemented in the digital domain as processing steps in a software program, in hardware by circuit elements or state machines, or in combination of both software and hardware. Such functions may be employed in, for example, a digital signal processor, application specific integrated circuit, micro-controller, or general-purpose computer. Such hardware and software may be embodied within circuits implemented within an integrated circuit.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, various functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, for example, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

I claim:

1. A method performed by a receiver for trimming one or more clock buffers in a clock and data recovery system, comprising:
    synchronizing said clock and data recovery system to a transmit clock of a transmitter;
    sampling a transmit data signal received by said receiver in a loopback mode from said transmitter using at least a first latch in said receiver;
    transmitting a signal from the receiver to a phase shifter in the transmitter that causes the phase shifter to adjust a phase of said transmit data signal in said transmitter until values sampled by said first latch satisfy a first predefined criteria;
    transmitting a signal from the receiver to the phase shifter in the transmitter that causes the phase shifter to adjust said phase of said transmit data signal in said transmitter to an approximate phase location of a second latch in said receiver;
    sampling said transmit data signal using at least said second latch; and
    adjusting a phase of a clock buffer associated with said second latch until values sampled by said second latch satisfy a second predefined criteria.

2. The method of claim 1, wherein said first latch is one of a transition latch and a sample latch and said second latch is the other of said transition latch and said sample latch.

3. The method of claim 1, wherein a plurality of said clock buffers drive a plurality of transition clock signals and data sampling clock signals having a substantially uniform phase separation.

4. The method of claim 1, wherein said step of using the phase shifter to adjust said phase of said transmit data signal to an approximate phase location of said second latch further comprises the step of using the phase shifter to adjust said phase of said transmit data signal by approximately one-half of a unit interval.

5. The method of claim 1, wherein said first and second predefined criteria comprise a corresponding histogram exhibiting a predefined percentage of each possible logic value of said transmit data signal sampled by said first and second latch, respectively.

6. The method of claim 1, wherein said first and second predefined criteria comprise a substantially equal number of each possible logic value of said transmit data signal sampled by said first and second latch, respectively.

7. A receiver, comprising:
    a clock and data recovery system synchronized to a transmitter;
    a receive portion for receiving a transmit data signal from said transmitter in a loopback mode, wherein a phase of said transmit data signal is adjusted with a phase shifter in said transmitter to an initial phase where values of said transmit data signal sampled by a first latch in said receiver satisfy a first predefined criteria; and
    one or more clock buffers, wherein said phase of said transmit data signal is adjusted with the phase shifter in the transmitter from said initial phase to an approximate phase location of a second latch in said receiver, and wherein a phase of one of said clock buffers associated with said second latch is adjusted with the phase shifter in the transmitter until values of said transmit data signal sampled by said second latch satisfy a second predefined criteria.

8. The receiver of claim 7, wherein said first latch is one of a transition latch and a sample latch and said second latch is the other of said transition latch and said sample latch.

9. The receiver of claim 7, wherein a plurality of said clock buffers drive a plurality of transition clock signals and data sampling clock signals having a substantially uniform phase separation.

10. The receiver of claim 7, wherein said phase of said transmit data signal is adjusted with the phase shifter in the transmitter to said approximate phase location of said second latch by adjusting said phase of said transmit data signal with the phase shifter in the transmitter by approximately one-half of a unit interval.

11. The receiver of claim 7, wherein said first and second predefined criteria comprise a corresponding histogram exhibiting a predefined percentage of each possible logic value of said transmit data signal sampled by said first and second latch, respectively.

12. The receiver of claim 7, wherein said first and second predefined criteria comprise a substantially equal number of each possible logic value of said transmit data signal sampled by said first and second latch, respectively.

13. The receiver of claim 7, wherein one or more of said clock and data recovery system, said receive portion and said one or more clock buffers are implemented in one of an integrated circuit, a digital signal processor, a microprocessor, a micro-controller, and a general-purpose computer.

14. A clock and data recovery system for use in a receiver, comprising:
    a clock generation circuit for generating a plurality of clocks having a substantially uniform phase separation and synchronized to a transmitter, wherein a transmit data signal is received from said transmitter in a loopback mode and wherein a phase of said transmit data signal is adjusted by a phase shifter in said transmitter to an initial phase where values of said transmit data signal sampled by a first latch in said receiver satisfy a first predefined criteria; and
    a plurality of clock buffers each associated with a corresponding one of said plurality of clocks, wherein said phase of said transmit data signal is adjusted with the phase shifter in the transmitter from said initial phase to an approximate phase location of a second latch in said receiver, and wherein a phase of one of said plurality of clock buffers associated with said second latch is adjusted with the phase shifter in the transmitter until values of said transmit data signal sampled by said second latch satisfy a second predefined criteria.

15. The clock and data recovery system of claim 14, wherein said first latch is one of a transition latch and a sample latch and said second latch is the other of said transition latch and said sample latch.

16. The clock and data recovery system of claim 14, wherein a plurality of said clock buffers drive a plurality of transition clock signals and data sampling clock signals having a substantially uniform phase separation.

17. The clock and data recovery system of claim 14, wherein said phase of said transmit data signal is adjusted to said approximate phase location of said second latch by adjusting said phase of said transmit data signal with the phase shifter in the transmitter by approximately one half of a unit interval.

18. The clock and data recovery system of claim 14, wherein said first and second predefined criteria comprise a predefined percentage of each possible logic value of said transmit data signal sampled by said first and second latch, respectively.

19. The clock and data recovery system of claim 14, wherein one or more of said clock generation circuit and said plurality of clock buffers are implemented in one of an integrated circuit, a digital signal processor, a microprocessor, a microcontroller, and a general-purpose computer.

* * * * *